July 16, 1963  G. E. HAYS ETAL  3,097,919
METHOD OF PRECIPITATION OF SODIUM DIURANATE
Filed Dec. 14, 1959
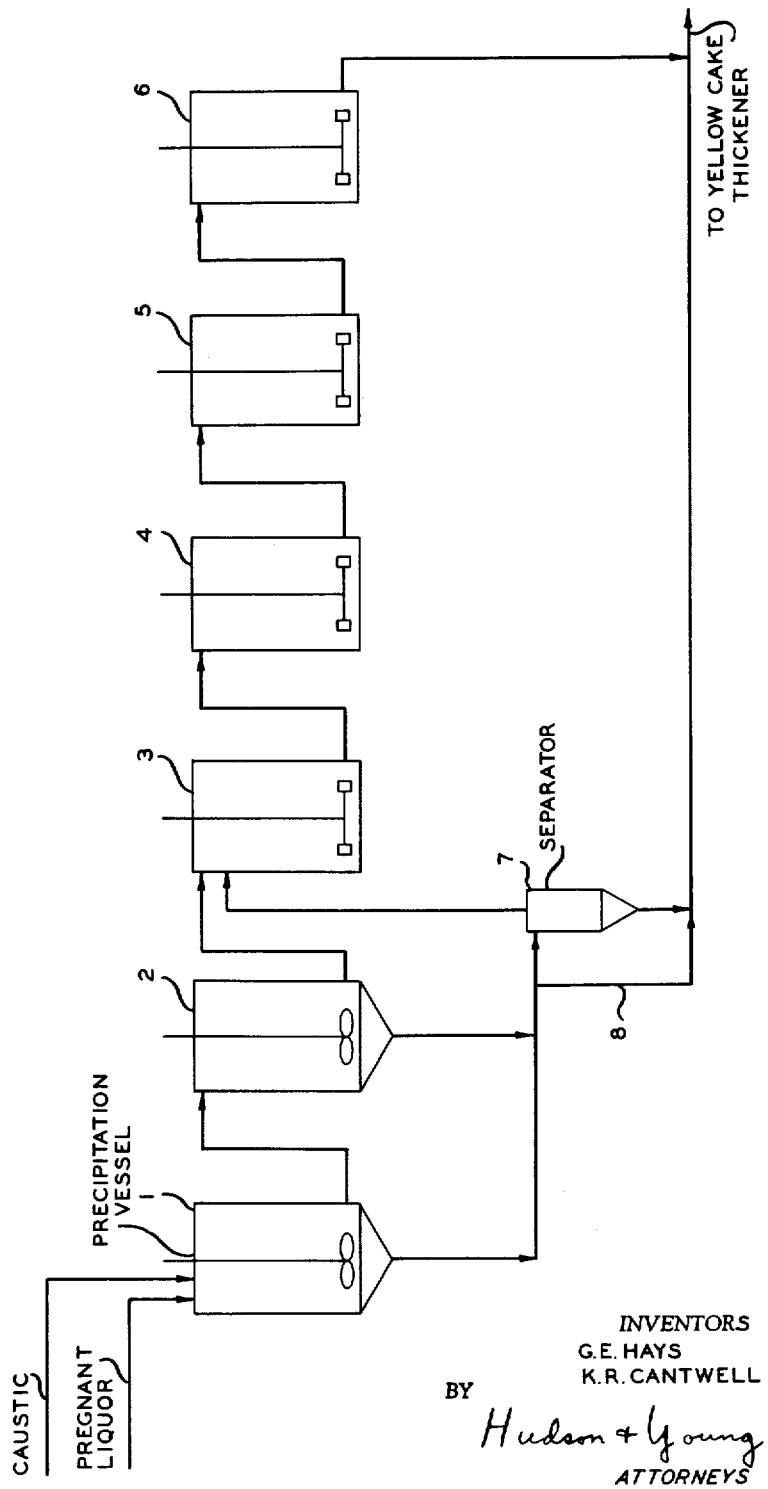
INVENTORS
G.E. HAYS
K.R. CANTWELL
BY
Hudson & Young
ATTORNEYS 3,097,919
METHOD OF PRECIPITATION OF SODIUM DIURANATE
George E. Hays and Kenneth R. Cantwell, Bartlesville, Okla., assignors to Phillips Petroleum Company, a corporation of Delaware
Filed Dec. 14, 1959, Ser. No. 859,495
2 Claims. (Cl. 23—14.5)

This invention relates to an improved method of precipitation. In one specific aspect it relates to an improvement in the precipitation of uranium yellow cake from a solution containing said yellow cake.

The separation of components from a multicomponent system by precipitation has not found wide spread industrial application. It has, of course, been used extensively in laboratories to effect the separation of components as a means of analysis. However, with the necessity of isolating uranium values from uranium-containing ore the process of precipitation has become increasingly important. Although this invention will be discussed as it applies to the isolation of uranium values, it is within the scope of this invention to apply it to industrial processes operating on similar principles.

In a process typical to the industry, ore comprising uranium-containing minerals is crushed, screened, and directed to a ball mill. In the ball mill the ore is wet ground in contact with an ammonium or soluble alkaline metal carbonate solution. The prepared slurry leaves the ball mill and passes through a classifier where oversized particles are returned to the ball mill. The remaining slurry passes on to a thickener. The thickened slurry is contacted with an oxidant and then filtered to generate a solution termed "pregnant liquor." In concentrating uranium values from the pregnant liquor a process of precipitating uranium values in the form of yellow cake is employed.

The pregnant liquor is charged to the first of a series of precipitation vessels. To this liquor is added a precipitating agent and the admixture is agitated so as to maintain the precipitated yellow cake crystals in suspension. The mother liquor and suspended crystals are passed to a second vessel wherein precipitation continues and the crystals are kept in suspension by agitating the solution. The mother liquor and crystals are passed to succeeding precipitation vessels in like manner until the precipitation of the yellow cake crystals is complete.

In the operation of the above procedure found in the prior art, difficulty is experienced in maintaining the crystals in suspension throughout the precipitation system as the greater part of the precipitation occurs in the initial stages. The power requirement of the agitators is necessarily high. Notwithstanding the use of increased agitation, the problem of the valuable cake crystals settling in the vessels has not been eliminated. Periodically the precipitation system must be taken out of service and the yellow cake crystals removed from the bottom of the precipitation vessels. The removal is accomplished with difficulty as the yellow cake crystals have become compressed and adhere to the vessel.

It is an object of this invention to provide an improved method of precipitation.

Another object of the invention is to provide an improved method of precipitating uranium yellow cake from the solution containing uranium values.

Still another object of this invention is to control the settling of crystals and reduce power requirements in the precipitation of uranium yellow cake from a solution containing uranium values.

The foregoing objects are realized broadly by withdrawing the precipitated crystals as they appear during the initial stages of the precipitation process.

The drawing is a flow diagram of a precipitation process that employs the claimed invention.

Referring to the drawing, pregnant liquor is charged continuously to a precipitation vessel 1. The pregnant liquor contains uranium in the form of sodium uranyl tricarbonate $[Na_4UO_2(CO_3)_3]$. To this liquor is added a precipitating agent, sodium hydroxide, and the mixture is agitated slowly. Crystals are precipitated and grow until they attain a size enabling them to settle in a separate phase in the lower region of the vessel 1. The precipitation reaction may be expressed as follows: $2Na_4UO_2(CO_3)_3 + 6NaOH \rightarrow Na_2U_2O_7 + 6Na_2CO_3 + 3H_2O$. The settled crystals are withdrawn from the bottom of the vessel and passed to a separator 7. The mother liquor containing smaller suspended crystals is withdrawn continuously from the lower region of the precipitation vessel 1 and passed to the upper region of the second precipitation vessel 2.

Crystals continue to be precipitated and to grow in the second precipitation vessel 2 while the liquor is agitated slowly. As in the first precipitation vessel 1 the crystals settle to the lower region of the vessel 2 as they attain a size too large to remain in suspension. The settled crystals are withdrawn from the bottom of the vessel 2 and passed to the separator 7. The mother liquor containing smaller suspended crystals is continuously withdrawn from the lower region of the vessel 2 and passed to the upper region of the third precipitation vessel 3.

Agitation is maintained at a high rate within the vessel 3 enabling the crystals precipitated to remain in suspension. The mother liquor containing the suspended crystals is passed to a fourth precipitation vessel 4 and precipitation continues under the same conditions maintained in the third vessel 3. The mother liquor and suspended crystals are continuously passed to succeeding precipitating vessels in like manner until precipitation substantially ceases. To illustrate the operation of this invention six precipitation vessels are used.

The crystals withdrawn from the bottom of the first two precipitation vessels are passed to a cyclone separator 7 where the crystals are separated from the entrained mother liquor. The step of separating crystals from the mother liquor at this particular stage improves the efficiency of the process but it is within the scope of the invention to eliminate it, passing the crystals and entrained mother liquor through line 8. The mother liquor from the separator 7 is charged to the third precipitation vessel 3. The crystals from the separator 7 are combined with the mother liquor and suspended crystals from the last in the series of precipitation vessels. The combined stream is then charged to precipitate thickeners.

Most of the precipitation occurs in the first two vessels with the remaining vessels allowing time for complete precipitation and crystal growth. By removing the larger crystals from the first two vessels the problem of settling in the two vessels is eliminated, and so markedly reduced in the remaining vessels as to be of negligible quantity. Obviously, by removing the larger precipitated crystals in the initial stages of the precipitation process the agitator power requirements have been greatly reduced. In reducing the agitation in the first two vessels crystal particles of smaller size will settle to the bottom than under normal agitation. Therefore, a greater number of crystals will settle, but as the crystals are smaller in size, the total weight of the settled crystals is less.

The first two precipitation vesels of the drawing have conical bottoms. This is a preferred embodiment but to one skilled in the art it is obvious that the invention could be practiced using conventional precipitation vessels. However, the efficiency would be reduced.

The effectiveness of this invention can best be illustrated by comparing the results obtained while operating under normal precipitation conditions and under conditions established by the claimed invention.

*Example I*

Pregnant liquor, containing uranium values in the form of unprecipitated sodium uranyl tricarbonate, at the rate of 200 g.p.m. and 3 g.p.m. of a 50 percent solution of sodium hydroxide are introduced into the first of a series of six precipitation vessels. The concentration of recoverable yellow cake in the charged pregnant liquor is 3 grams/liter. The mixture is agitated at a rate of 1800 r.p.m. with a 10 h.p. mixer. The mother liquor containing suspended precipitated crystals of yellow cake is continuously withdrawn from the first precipitation vessel and passed to the second vessel where precipitation of the yellow cake is continued under the same conditions maintained in the first vessel. In like manner there is a continuous withdrawal of mother liquor and suspended crystals from the second vessel and the passing of liquor and suspended crystals to a third precipitation vessel. The process is repeated throughout the series of six precipitation vessels. A temperature of 140° F. is maintained throughout the precipitation system and the total capacity is such as to allow a total residence time in the precipitation vessels of 12 hours. The results obtained for a 24 hour period of operation are as follows:

Charge (pregnant liquor) to 1st precipitation vessel_____gallons__ 288,000
Unprecipitated yellow cake in charge__pounds__ 7,612
Precipitated yellow cake to thickener____do____ 4,365
Precipitated yellow cake remaining in
  1st and 2nd precipitation vessels_____do____ 2,362
Precipitated yellow cake remaining in
  last four precipitation vessels_____do____ 885

From the above results it can be readily ascertained that 31 percent of the precipitated yellow cake settles in the first two precipitation vessels. With the present value of the yellow cake this represents a considerable loss and must be recovered by taking the precipitation vessels out of service and manually extracting the yellow cake from the bottom of the vessels.

*Example II*

The same charge and charge rate as in Example I are maintained in Example II. The agitation rate in the first two precipitation vessels is reduced to 1400 r.p.m. and the precipitation vessels are modified by placing conical bottoms in the first two precipitation vessels. The crystals settling in the first and second vessels are pumped to a cyclone separator. Crystals from the separator are passed to the thickener and the liquor from the separator is passed to the third precipitation vessel. All other conditions of operation are identical to the operation in Example I. The results based on a 24 hour operation period are as follows:

Charge (pregnant liquor) to 1st precipitation vessel_____gallons__ 288,000
Unprecipitated yellow cake in charge__pounds__ 7,612
Precipitated yellow cake to separator____do____ 2,192
Precipitated yellow cake to thickener
  from 6th precipitation vessel_____do____ 5,370
Precipitated yellow cake remaining in
  vessels_____ Negligible Comparing the above results with those obtained in Example I, it is noted that the weight of yellow cake settling to the bottom of the first and second precipitation vessels is less in the second case. This is attributed to the smaller size of the crystals so settling. Operating under the conditions specified it is no longer necessary to periodically shut down and remove settled yellow cake from the vessels.

As will be evident to those skilled in the art, various modifications of this invention can be made, or followed, in the light of the foregoing disclosure and discussion, without departing from the spirit or scope thereof.

We claim:

1. In the process of precipitating uranium values as a yellow cake from a liquor containing said values in the form of sodium uranyl tricarbonate which comprises the continuous introduction of said liquor into the first of a series of precipitation vessels, adding thereto a caustic solution, admixing the liquor and caustic solution causing the precipitation and growth of yellow cake crystals; an improvement comprising the slow agitation of the admixture, permitting the larger crystals to settle in a separate phase in the lower region of said vessel, withdrawing said crystals from the bottom of said vessel, withdrawing mother liquor containing suspended yellow cake crystals from the lower region of said vessel, passing said mother liquor and said suspended crystals to the upper region of a second precipitation vessel, slowly agitating the admixture within said second precipitation vessel, permitting the larger crystals to settle in the separate phase in the lower region of said second precipitation vessel, withdrawing the crystals from the bottom of said second precipitation vessel, withdrawing mother liquor and suspended crystals from the lower region of said second precipitation vessel, passing said liquor and said crystals withdrawn from said second precipitation vessel to the upper region of a third precipitation vessel, maintaining the crystals in suspension in said third precipitation vessel by agitation, passing the mother liquor and suspended crystals from the lower region of said third precipitation vessel to succeeding vessels in like manner until precipitation susbtantially ceases, withdrawing the crystals from the bottom of the last in a series of precipitation vessels, and passing said crystals withdrawn from said vessel, said second precipitation vessel and said last in a series of precipitation vessels to a precipitate thickener.

2. In the process of precipitating uranium values as a yellow cake from a liquor containing said values in the form of sodium uranyl tricarbonate which comprises a continuous introduction of said liquor into the first of a series of precipitation vessels, adding thereto a caustic solution, and admixing the liquor and caustic solution causing the precipitation and growth of yellow cake crystals; an improvement comprising the slow agitation of the admixture, permitting the larger crystals to settle in a separate phase in the lower region of said vessel, passing said crystals from the bottom of said vessel to a separation zone, withdrawing mother liquor containing suspended yellow cake crystals from the lower region of said vessel, passing said mother liquor and said suspended crystals to the upper region of a second precipitation vessel, slowly agitating the admixture within said second precipitation vessel, permitting the larger crystals to settle in a separate phase in the lower region of said second precipitation vessel, passing crystals from the bottom of said second precipitation vessel to said separation zone, withdrawing mother liquor and suspended crystals from the lower region of said second precipitation vessel, passing said liquor and said crystals withdrawn from said second precipitation vessel to the upper region of a third precipitation vessel, withdrawing a separated liquor from said separation zone and combining said separated liquor with the charge of mother liquor and suspended crystals to said third precipitation vessel, passing crystals from said separation zone to a precipitate thickener, maintaining the crystals in suspension in said third precipitation vessel by agitation, passing the mother liquor and suspended crystals from the lower region of said third precipitation vessel to succeeding vessels in like manner until precipitation substantially ceases, and passing the crystals from said last in a series of precipitation vessels to said thickener.

(References on following page)

References Cited in the file of this patent

UNITED STATES PATENTS

| | | |
|---|---|---|
| 1,943,786 | Cowles | Jan. 16, 1934 |
| 2,606,820 | Harms | Aug. 12, 1952 |
| 2,631,926 | Eckstrom | Mar. 17, 1953 |
| 2,707,669 | Houston et al. | May 3, 1955 |
| 2,738,254 | Suhr | Mar. 13, 1956 |
| 2,792,282 | Pike | May 14, 1957 |
| 2,813,003 | Thunaes et al. | Nov. 12, 1957 |

OTHER REFERENCES

Perry: "Chemical Engineers Handbook," 3rd ed., pp. 942, 1065, 1066, McGraw-Hill (1950).

Clegg et al.: "Uranium Ore Processing," pp. 293, 315, 319, 321, 353, 360, 368. Addison-Wesley Publ. Co. (September 1958).

Second U.N. Inst. Conf. on Peaceful Uses of Atomic Energy, vol. 3, pp. 358, 360 (September 1958).